Figure 1:
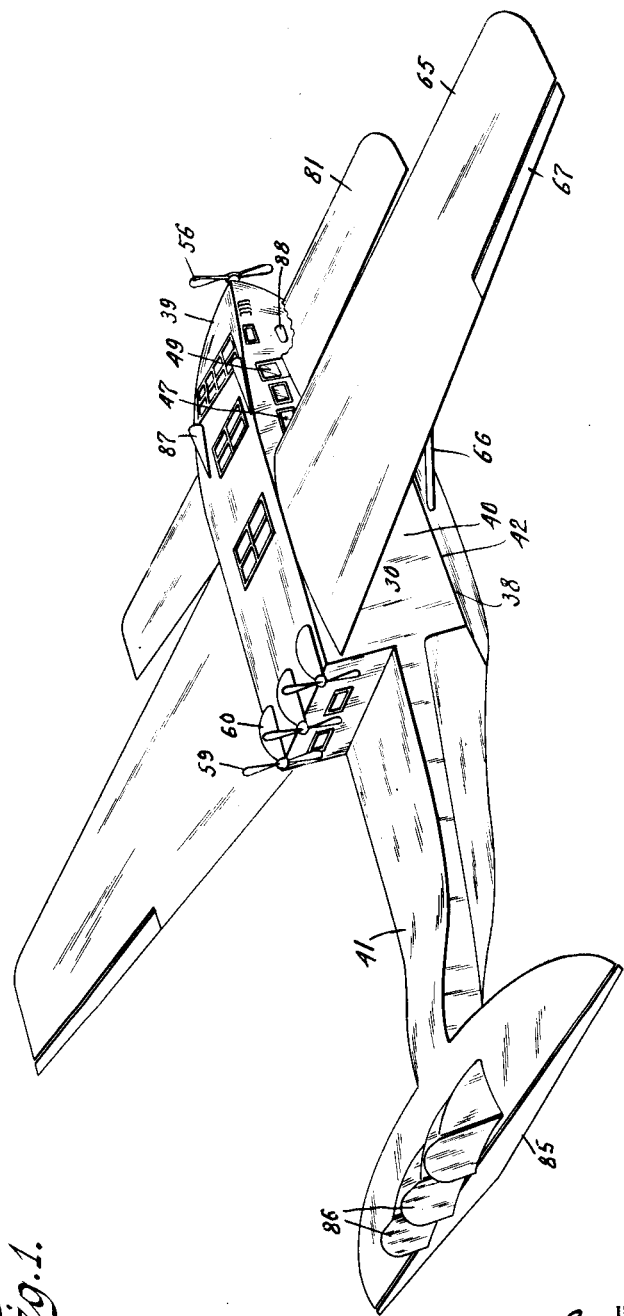
Figure 14:
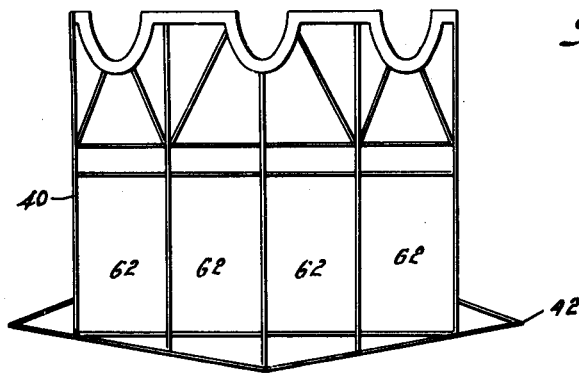
Figure 10:
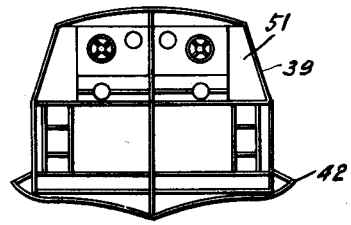
Figure 12:
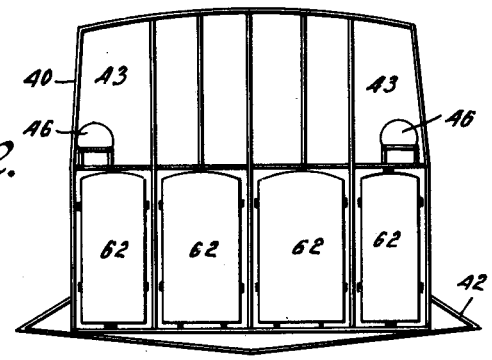
Figure 13:
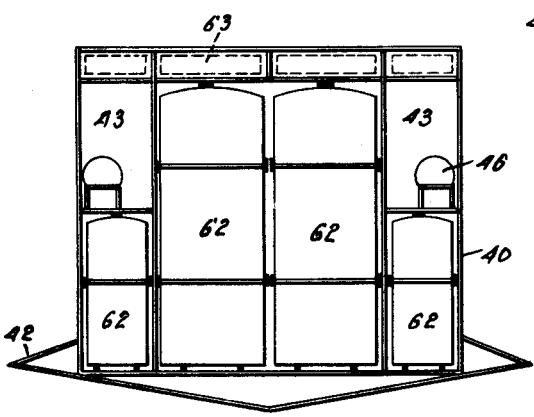

Feb. 3, 1931.  E. LALLI  1,790,988
AEROPLANE
Filed April 24, 1929   7 Sheets-Sheet 1

INVENTOR
E. Lalli
BY
Edmund Herzog
ATTORNEY

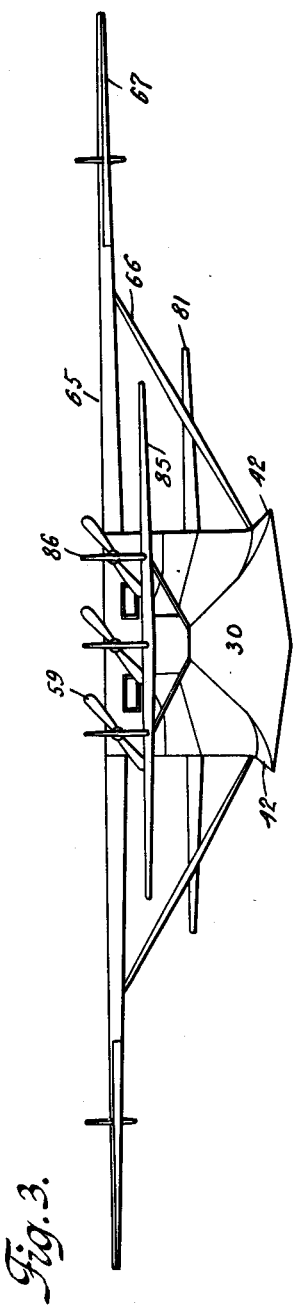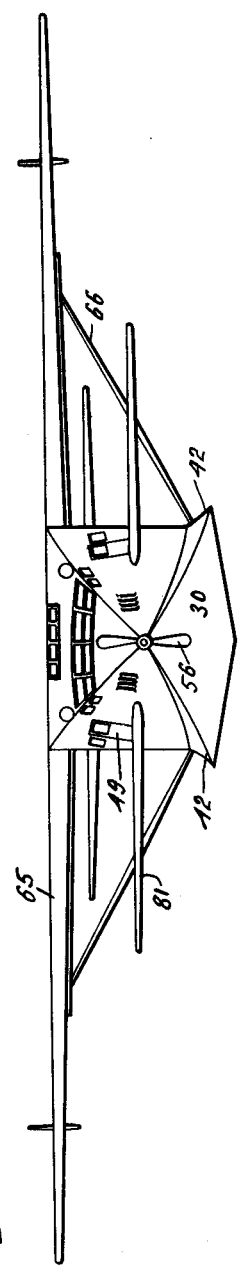

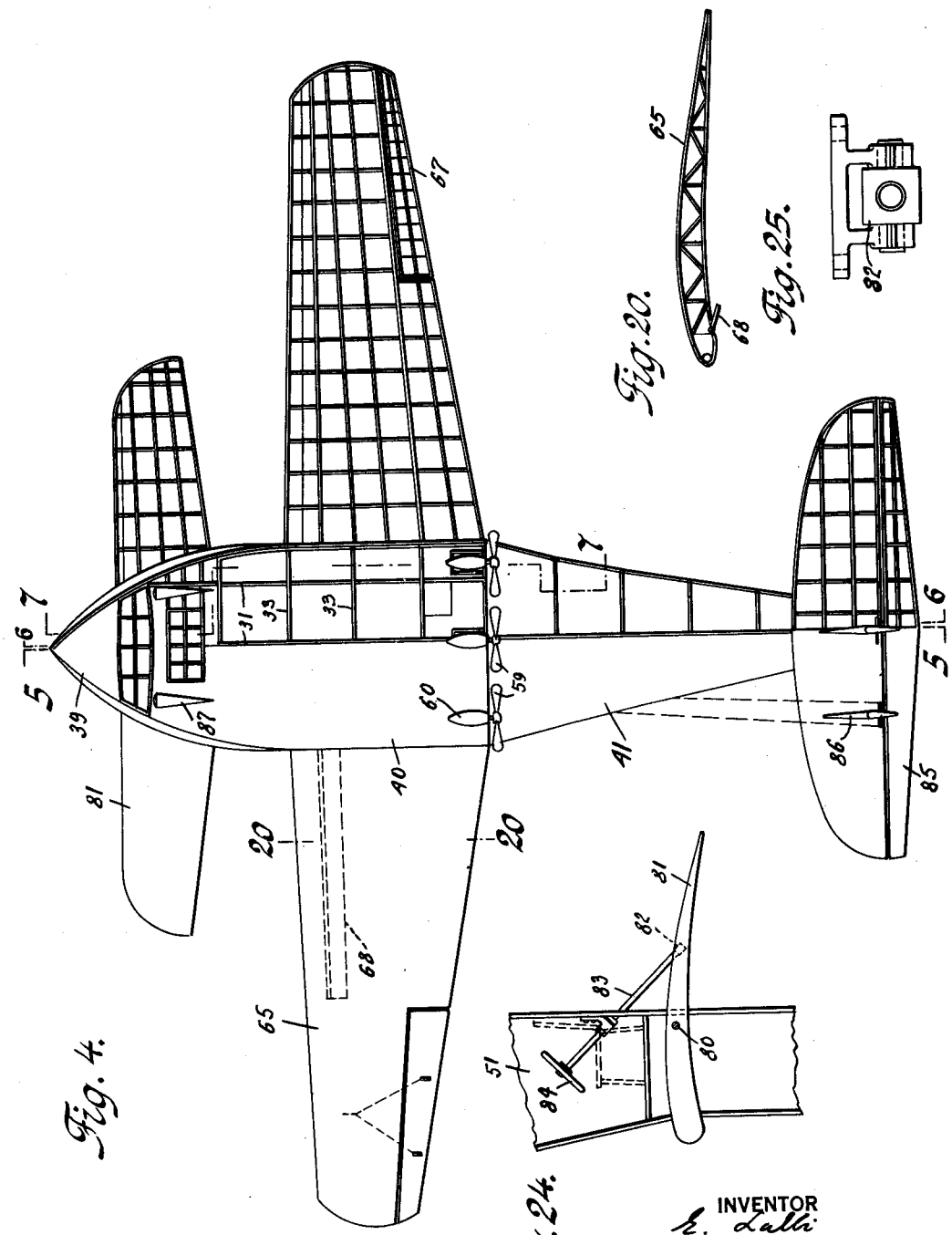

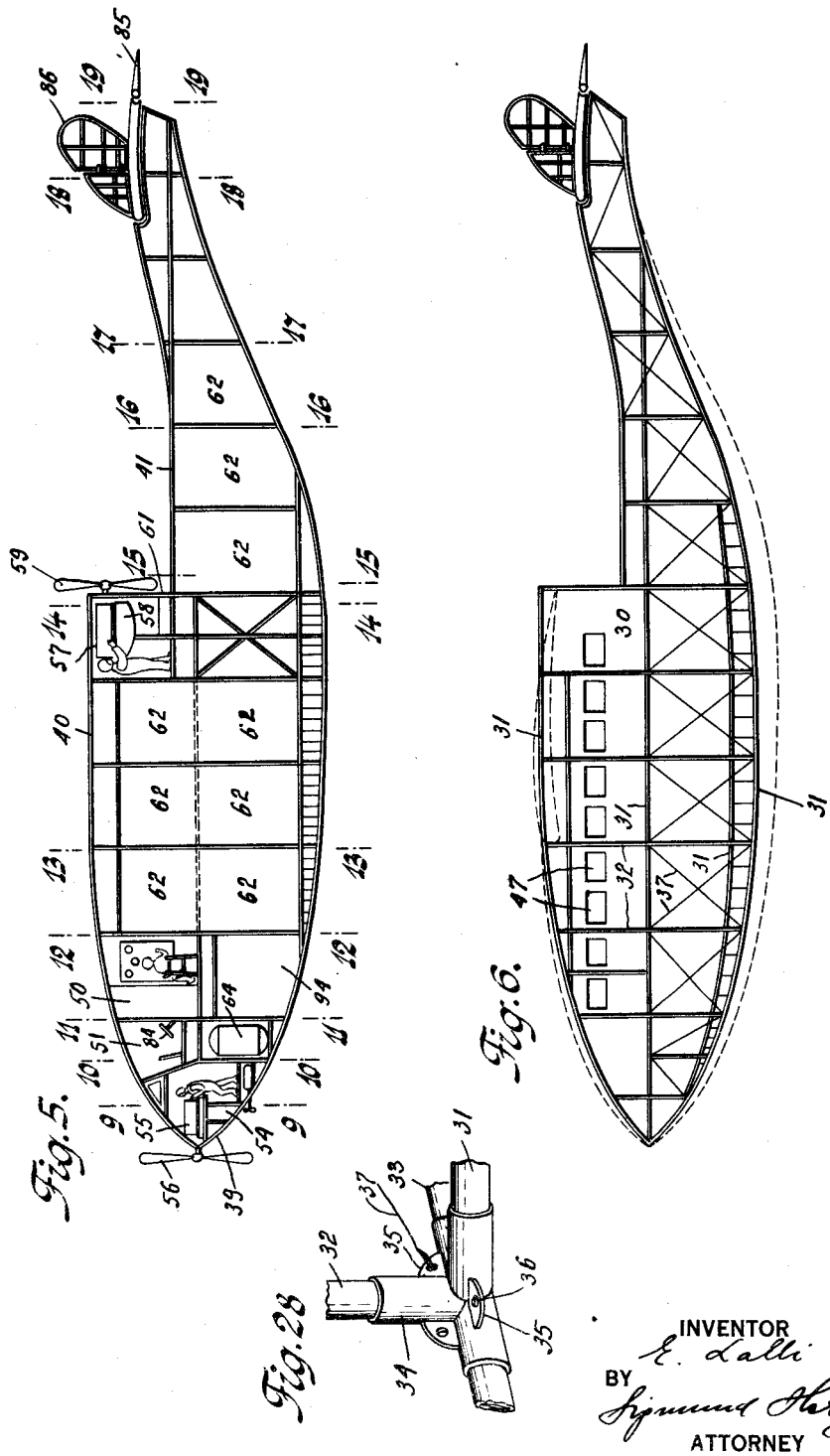

Feb. 3, 1931.  E. LALLI  1,790,988
AEROPLANE
Filed April 24, 1929   7 Sheets-Sheet 5
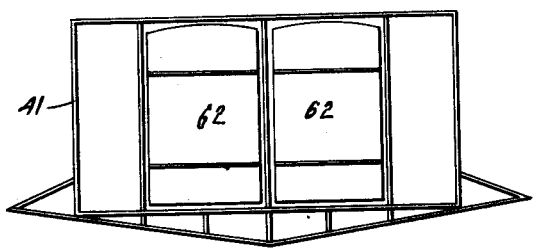
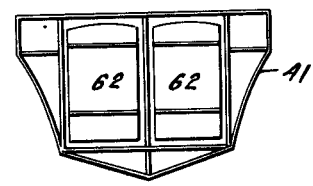
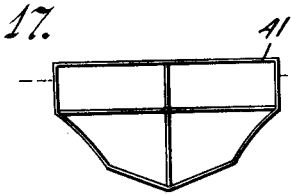
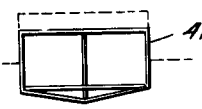
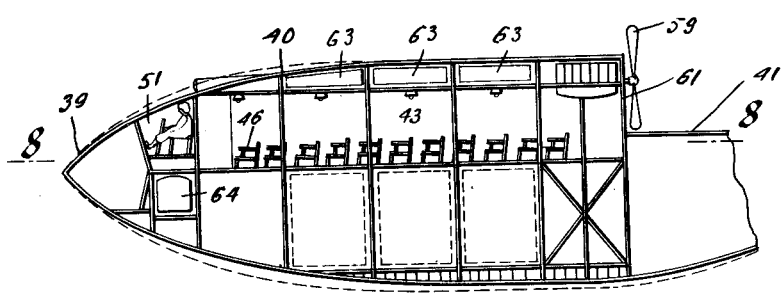

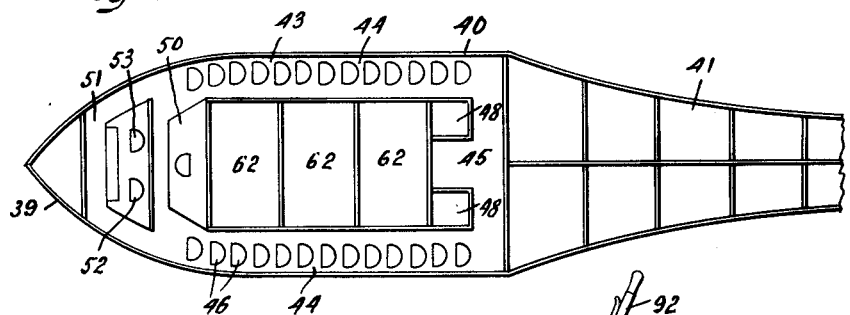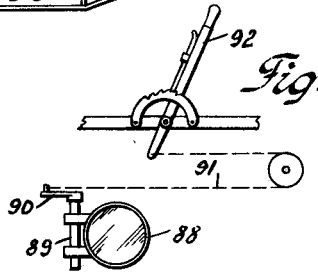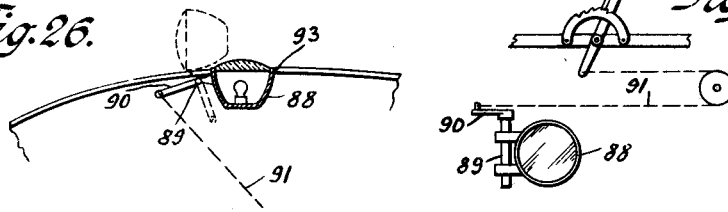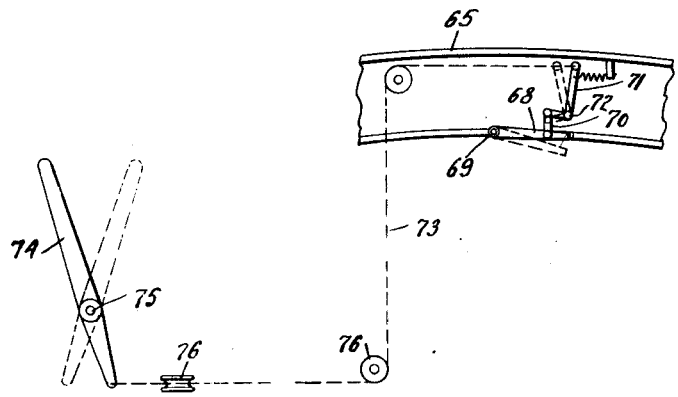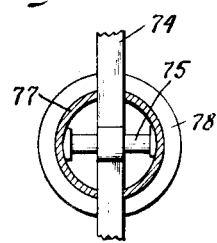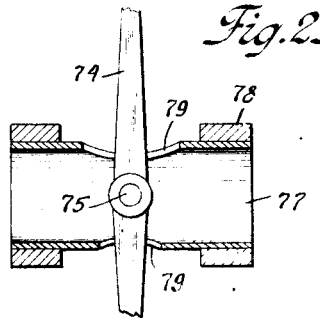

Feb. 3, 1931.  E. LALLI  1,790,988
AEROPLANE
Filed April 24, 1929  7 Sheets-Sheet 7

INVENTOR
E. Lalli
BY
Sigmund Herzog
ATTORNEY

Patented Feb. 3, 1931

1,790,988

UNITED STATES PATENT OFFICE

EUGENE LALLI, OF BROOKLYN, NEW YORK

AEROPLANE

Application filed April 24, 1929. Serial No. 357,713.

The present invention relates to improvements in aeroplanes of the monoplane type.

One of the objects of the invention is to provide an aeroplane having a fuselage of stream-line shape to keep resistance to progress at a minimum, said fuselage having a bottom that is V-shaped in transverse cross-section to reduce resistance to speed movement through the water, said bottom being provided with laterally extending or inclined longitudinal fins which not only raise the aeroplane out of water and diminish the amount of submerged surface but serve at the same time to prevent rolling of the aeroplane in water.

Another object of the invention is to provide an aeroplane having a tractor-propeller and one or more pusher-propellers, the latter rotating in bearings placed immediately upon the top of the fuselage and working against a step between the midship section and the tail section of the fuselage, whereby the efficiency of the said pusher-propellers is greatly increased and the resistance of the bearings to the air considerably decreased.

A further object of the invention is to provide an aeroplane which uses the sustaining lift of lighter-than-air gases, the fuselage being divided into a large number of compartments, some of which receive gas bags.

A still further object of the invention is to so mount the several motors of the aeroplane in cockpits of the fuselage that convenient access may be had thereto for attendance, repair, etc., while in flight.

A further object of the invention is to provide a passenger accommodating cabin in the midship section of the fuselage consisting of two chambers, between which are disposed some of the gas bags above referred to, and which chambers are properly connected so that the passengers may conveniently pass from one of same into the other, said chambers being each provided with suitable windows to admit light and air.

A still further object of the invention is to provide in the fuselage a compartment for the wireless operator of the vessel, which compartment is properly isolated so that exterior noises do not interfere with the operation of the wireless apparatus but which is so located that communication may be had with the pilot of the aeroplane.

Still a further object of the invention is to provide a pair of auxiliary aerofoils or wings which are pivotally connected with the fuselage on an axis parallel to the longitudinal axis of the said wings, so that the same serve not only as auxiliary supporting surfaces but also as a means serving, first, to vary the angle of attack according to the requirements, second, to restore the balance of the aeroplane in case its center of gravity changes, third, to obtain an auxiliary rudder to control the flight vertically, in case the main rudder is disabled, and, fourth, to decrease the speed of the aeroplane in landing.

A still further object of the invention is to provide the main aerofoils of the aeroplane with auxiliary ailerons, which serve to increase the sustaining power of the aerofoils and to properly balance the vessel.

A still further object of the invention is to provide a pair of searchlights on the fuselage which are adapted to be folded into the same, when not in use, so as not to offer resistance to the air.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a perspective view of an aeroplane constructed in accordance with the present invention; Fig. 2 is a front elevation thereof; Fig. 3 is a rear elevation of the same; Fig. 4 is a plan view of the same, certain parts being removed in order to more clearly show the construction; Fig. 5 is a section taken on line 5—5 of Fig. 4; Fig. 6 is a section taken on line 6—6 of Fig. 4; Fig. 7 is a section taken on line 7—7 of Fig. 4; Fig. 8 is a section taken on line 8—8 of Fig. 7; Figs. 9 to 19, inclusive, are sections taken in their order on lines 9—9, 10—10, 11—11, 12—12, 13—13, 14—14, 15—15, 16—16, 17—17, 18—18 and 19—19 of Fig. 5; Fig. 20 is a section taken on line 20—20 of Fig. 7, on a larger scale; Fig. 21 is a diagrammatic view of means for actuating the auxiliary ailerons; Fig. 22 is a front elevation, partly in section, of a portion of the actuating lever, shown in Fig. 21; Fig. 23 is a longitudinal section taken through the device shown in Fig. 22; Fig. 24 is a diagrammatic view illustrating the actuating means for the auxiliary aerofoils; Fig. 25 is a front elevation, on a larger scale, of the connecting means between the auxiliary aerofoils shown in Fig. 24 and the actuating means therefor; Fig. 26 is a top plan view, partly in section, of one of the searchlights; Fig. 27 is a diagrammatic view of the actuating means for the said searchlight; and Fig. 28 is a perspective view, on a larger scale, of a joint between the elements of the frame of the fuselage.

Referring now to the drawings in detail, the numeral 30 indicates the fuselage of the aeroplane, which is preferably formed of tubing. In the construction of the fuselage the longitudinal frame members 31 are connected and braced by upright and transverse struts 32 and 33, respectively, located at substantially equidistant points or at such points as may be found desirable for obtaining the greatest strength and efficiency. The longitudinal frame members, upright and transverse struts are connected by tubular joints 34 (Fig. 28), which are provided with brackets 35, preferably made integral therewith. Each of these brackets is provided with an aperture 36, to receive the ends of diagonally disposed stay-wires 37. The fuselage is provided with a covering 38 of any suitable type.

The fuselage includes a bow portion 39, a midship section 40 and a tail section 41. The bow portion is pointed, as usual in constructions of this type, and the bottom of both the bow and midship sections is V-shaped in transverse cross-section, as shown in Figs. 9 to 14, inclusive, of the drawings. The front end of the tail section, where it joins the midship section, has also a bottom of V-shape, as shown in Fig. 15 of the drawings. Generally, the fuselage has a stream-line shape intended to avoid eddying and discontinuity, and to preserve stream-line flow, thus keeping resistance to progress at a minimum. The V-shaped bottom has a similar effect both in the air and when the vessel is proceeding in water. In order to increase the stability of the fuselage both in air and in water, longitudinal fins 42 are formed on the fuselage along the bottom. These fins not only raise the aeroplane out of water and diminish the amount of submerged surface, but serve at the same time to prevent rolling of the aeroplane in water.

It will be noted that in the present disclosure the invention is applied to an aeroplane of the passenger-carrying type. For this purpose, there is formed in the midship section of the fuselage a cabin 43 which, in height, occupies only one-half of the midship section of the fuselage (see Figs. 12 and 13). This cabin extends from the section 12—12 rearwards to the tail section of the fuselage and is in horizontal section substantially U-shaped, it including two longitudinal chambers 44, connected in the rear by a transverse passage 45. In each chamber is provided a row of seats 46, said seats extending along the longitudinal walls of the fuselage, which walls are provided with windows 47 to admit air and light. The passengers may pass from one chamber to the other through the transverse passage 45, in which are situated lavatories 48. Access may be had to the cabin through doors 49.

Forward of the cabin is disposed a compartment 50 for the wireless operator of the aeroplane, and in front of this compartment is a driving compartment 51 containing seats 52 and 53 for the pilot and mechanic. In the last-mentioned compartment are also positioned the several control mechanisms of the vessel. Communication may be had between compartments 50 and 51 through a window, not shown.

Forward of the driving compartment is located in a cockpit 54, in which is disposed a power plant 55 for operating a propeller 56, which is of the tractor type. In rear of the cabin is located an engine room 57, containing a plurality of power plants 58, in the present case three, each of which is adapted to actuate a propeller 59 of the pusher type. The shafts of these propellers are journaled in bearings 60, which are mounted on top of the midship section of the fuselage, said propellers being disposed in rear of the midship section which is provided with a vertical end wall 61, constituting a step between the midship section and the tail section of the fuselage. The height of the tail section is substantially one-half of the height of the midship section. Due to this arrangement the bearings 60 may be disposed directly on top of the midship section and thereby offer little resistance to the air, in contradistinction to the constructions heretofore in use in which the pusher type propellers are usually mounted above the top of the midship section and, consequently, in bearings which rise a substantial distance above the said top.

Inasmuch as the cockpit 54 and engine compartment 57 contain the power plants, it is obvious that the engineers who attend to these power plants may operate the same and also are capable of making repairs without stepping outside of the fuselage. The engineers may freely go back and forth from the cockpit to the engine compartment.

Figure 11:
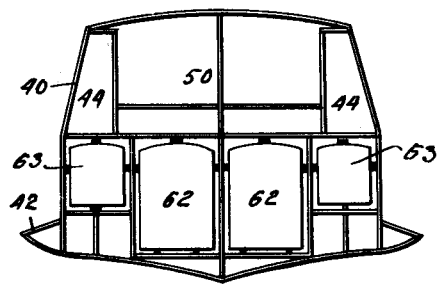
Figure 9:
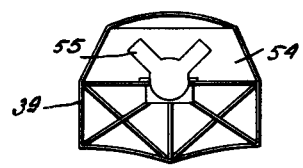

Between the chambers 44 and also below the cabin, and also in the tail section of the fuselage are provided compartments 62, in which may be disposed bags or other containers holding lighter-than-air gases, for increasing the carrying capacity of the vessel. If necessary, these bags or containers may hold combustible gases for the operation of the power plants, which are usually in the form of internal combustion engines. Gasoline or other liquid hydrocarbon fuel for the operation of the said engines may be stored in tanks 63 which are disposed above the passenger carrying cabin, as shown in Fig. 7 of the drawings, and also below the same as indicated in Fig. 11. Lubricating material may be stored in one or more tanks 64, located below the driver's compartment.

In constructing the aeroplane in accordance with the present invention, an aerofoil or wing 65 is disposed on each side of the midship section of the fuselage. This wing is of the internal trussed or of the deep cantilever type, commonly used in monoplane constructions, and is supported from and connected to the fuselage by the usual struts 66. It is provided with ailerons 67 of the usual type and for the well-known purpose. In addition to these ailerons, there are provided adjacent the leading edge of the aerofoil auxiliary ailerons 68. These are hinged at 69 along their leading edges to the underface of the aerofoil, one on each side of the fuselage. Each of these auxiliary ailerons is connected by a link 70 (Fig. 21) with a bell-crank lever 71, which is fulcrumed at 72 to the aerofoil and connected by a cable 73 with a lever 74, that is fulcrumed at 75 to a tube 77, the latter being rotatably mounted in bearings 78 within the driving compartment. The lever 74 extends through slots 79 in the tube 77 (Figs. 22 and 23). The cables run over sheaves 76. Assuming that the elements are in the positions shown in full lines in Fig. 21 of the drawings, in which the auxiliary ailerons 68 are flush with the underface of the aerofoil, it is obvious that the said auxiliary ailerons have no function at all. If the sustaining power of the aerofoil is to be increased, the operating lever 74 is shifted into the position shown in dotted lines in Fig. 21 of the drawings, whereby the auxiliary aileron is brought into the position shown in dotted lines in Fig. 21 of the drawings. On the other hand if only one of these auxiliary ailerons is to be shifted out of the aerofoil, the lever 74 is swung sideways so as to rotate the tube 77 in the bearings 78. In doing this, obviously a pull is exerted on one of the cables 73, which causes the corresponding auxiliary aileron to project out of the aerofoil. This is done in case the balance of the aeroplane is to be restored.

In front of and below the aerofoil is pivoted at 80 to the fuselage an auxiliary aerofoil 81, having a sustaining surface considerably smaller than that of the aerofoil 65. The pivot 80 extends parallel to the longitudinal axis of the aerofoil 81 (Fig. 24), so that the angle of incidence of the aerofoil may be varied according to the requirements. For the purpose of actuating the aerofoil 81, the latter is connected by a universal joint 82, shown in detail in Fig. 25 of the drawings, with an actuating rod 83 which extends into the driver's compartment 51, where it has mounted thereon a control wheel 84. One of the purposes of the auxiliary aerofoil is to increase the sustaining surface of the aeroplane. Another purpose is to vary the angle of attack of the aeroplane according to the requirements by changing the angle of incidence of the auxiliary aerofoil. A further purpose of this auxiliary aerofoil is to balance the aeroplane in case the center of gravity thereof changes either by loading the same or as the load shifts thereon. Still a further purpose of this auxiliary aerofoil is to constitute a rudder for steering the aeroplane in a vertical plane in case the main rudder of the vessel is disabled. This main rudder is indicated in the drawings by the numeral 85, and the rudders which steer the vessel in a horizontal plane are denoted by the numeral 86. A still further purpose of the auxiliary aerofoil is to decrease the speed of the aeroplane in landing.

On top of the fuselage, and more particularly adjacent the bow portion thereof are provided two headlights 87. Two searchlights 88 are mounted on the sides of the fuselage in the bow portion of the device (Figs. 1, 26 and 27). Each of these searchlights is pivoted at 89 to a stationary part of the fuselage (Fig. 26) and the pivot pin has fixed to it a crank 90 (Fig. 27), which is connected by a cable 91 with an actuating lever 92, the latter being disposed in the driving compartment 51 of the vessel. The searchlights 88 are normally each disposed in a pocket 93 in the fuselage, as shown in full lines in Fig. 26 of the drawings. If these searchlights are to be made use of, that is to say if they are to project a beam of light in the direction of flight, the lever 92 is shifted from the position shown in Fig. 27 of the drawings forward, whereby the searchlights 88 are swung into the dotted position shown in Fig. 26 of the drawings.

Some of the compartments of the fuselage may be used for storing baggage, for instance the compartments 94 shown in Fig. 5 of the drawings.

What I claim is:—

1. An aeroplane comprising a fuselage including a bow, a midship section and a tail section, said midship section being divided horizontally into an upper deck and a lower deck, said upper deck being divided into a passenger-carrying cabin including two longitudinal compartments joined by a transverse passage, a wireless operator compartment in front of said cabin and a power plant containing compartment in rear of said cabin, said bow being divided into a driving compartment and into a power plant containing cockpit.

2. An aeroplane comprising a fuselage, a main supporting surface disposed as a single wing on each side of said fuselage, an auxiliary supporting surface pivoted to said fuselage, and means adapted to be operated from within said fuselage for varying the angle of incidence of said auxiliary supporting surface, said auxiliary supporting surface being wholly disposed in front of and below said main supporting surface.

3. An aerofoil for aeroplanes having a leading and a trailing edge, main ailerons at the trailing edge of said aerofoil, and two auxiliary ailerons adjacent the leading edge of said aerofoil, and a single means for actuating, at will, both or either one of said auxiliary ailerons.

4. A chambered aerofoil for aeroplanes having a leading edge and a trailing edge, main ailerons at the trailing edge of said aerofoil, two auxiliary ailerons on the underface of said aerofoil adjacent the leading edge thereof, said auxiliary ailerons being normally flush with the underface of said aerofoil, and a single means for extending, at will, both or either one of said auxiliary ailerons at an angle to the underface of said aerofoil.

5. An aeroplane comprising a fuselage including a bow, a midship section and a tail section, the bottom of said tail section forming a continuation of the bottom of said midship section and the height of said tail section at the point of juncture with the midship section being substantially less than the height of said midship section, said midship section including a power plant containing compartment immediately in front of said tail section and below the top of said midship section, propeller shafts projecting from the rear of said midship section, and a propeller on each shaft in rear of said midship section and above said tail section.

6. An aeroplane comprising a fuselage including a bow, a midship section and a tail section, the midship section including the power plant containing compartment in its rear end portion, and said bow including a power plant containing cockpit, said power plant containing compartment and said power plant containing cockpit being connected by an intercommunicating passage.

Signed at New York city, in the county of New York, and State of New York, this 23rd day of April A. D. 1929.

EUGENE LALLI.